July 23, 1946. F. B. LANE 2,404,639
MEANS TO TURN ROTATABLE STRUCTURES
Filed April 10, 1942 2 Sheets-Sheet 1
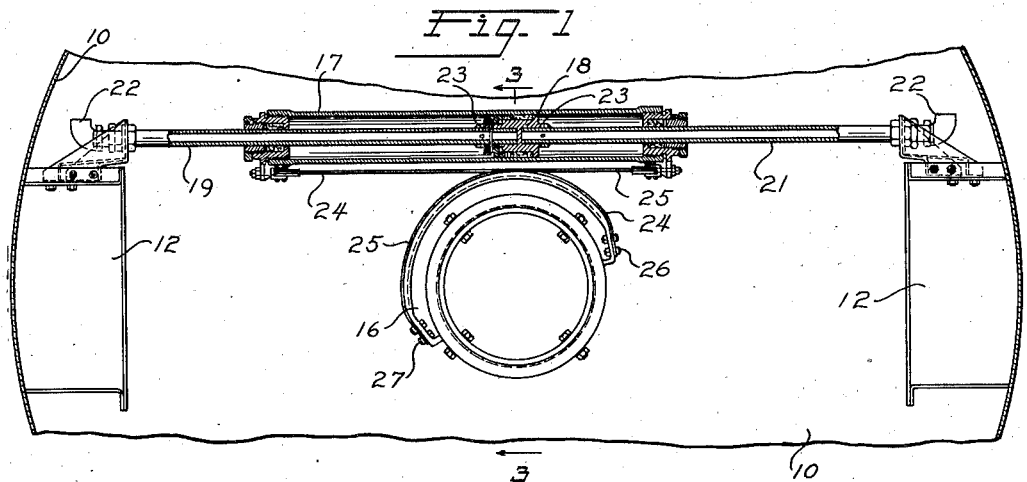
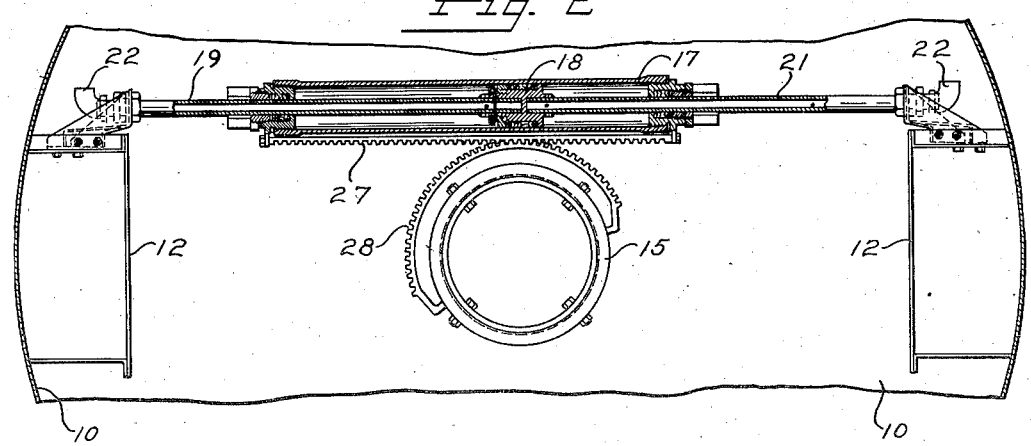
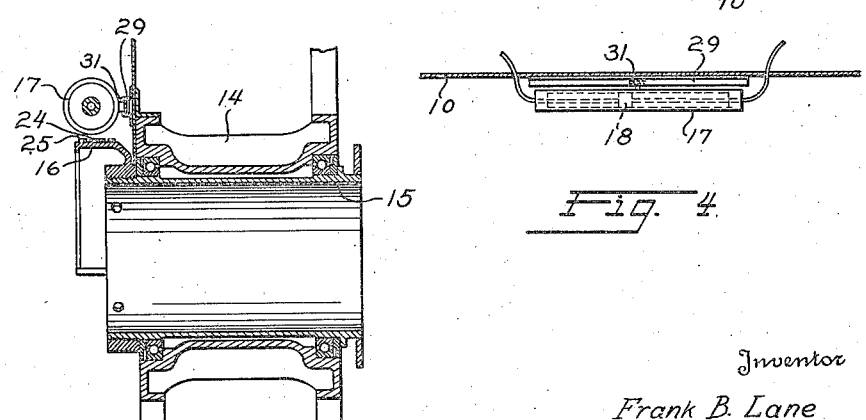
Inventor
Frank B. Lane Patented July 23, 1946

2,404,639

UNITED STATES PATENT OFFICE 2,404,639

MEANS TO TURN ROTATABLE STRUCTURES

Frank B. Lane, College Park, Md., assignor to Engineering and Research Corporation, Riverdale, Md., a corporation of Maryland Application April 10, 1942, Serial No. 438,495

6 Claims. (Cl. 74—91)

This invention relates to means to turn rotatable structures and, more particularly, to power means for rotating turrets and the like.

One of the objects of the invention is to provide means for turning rotatable structures in which the structure is turned by power means which are self-contained therein.

Another object of the invention is to provide means for turning rotatable structures in which the structure is turned by a fluid motor of simple construction, having a minimum number of parts, but which provides for positive controlled movement of the structure.

Another object of the invention is to provide means for turning rotatable structures in which the structure is turned about a central drum by a motor carried by the structure and operatively connected to the drum. According to one feature of the invention, the drum is fixed and the motor and structure move around it as the motor is operated.

Still another object of the invention is to provide means for turning rotatable structures in which the structure is turned by a motor having one part fixed and another part connected to the structure either directly or through a central drum rigid therewith.

A still further object of the invention is to provide means for rotating a structure by the movement of a cylinder with respect to a piston associated therewith.

The above and other objects and advantages of the invention will be more readily apparent from the following description when read in connection with the accompanying drawings, in which:

Fig. 1 is a plan view, with parts broken away and in section, of an apparatus embodying the invention;

Fig. 2 is a view similar to Fig. 1 showing an alternative construction;

Fig. 3 is an enlarged partial section on the line 3—3 of Fig. 1;

Fig. 4 is a view of parts shown in Figs. 1 and 3, and illustrating a modified form of connection of the operating motor to the structure which is to be rotated;

Figure 5:
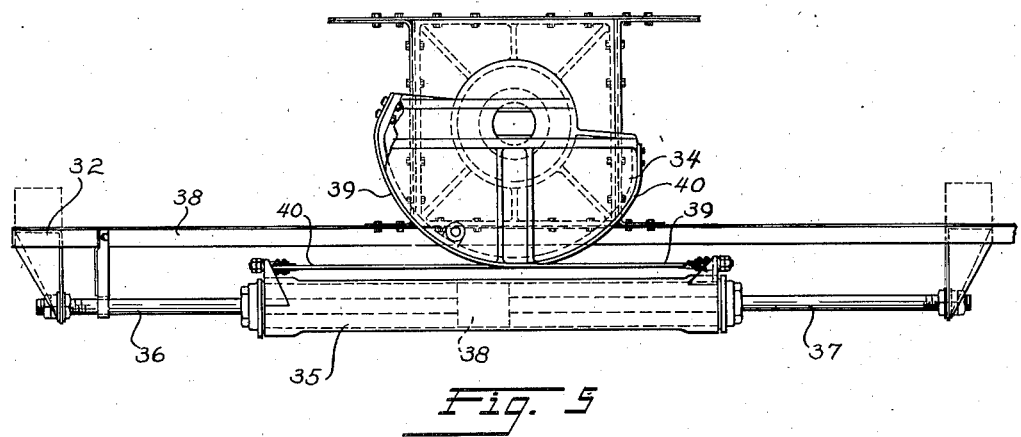
Fig. 5 is a plan view of a modified form of the invention.

The apparatus of Fig. 1 is illustrated in connection with a rotatable turret, indicated generally at 10, formed with internal bosses 12 on its opposite sides. The turret, as best seen in Fig. 3, is formed with a hub 14 which is rotatable on a fixed post 15 mounted centrally of the turret and carried by a non-rotatable part, such as a frame member. The post carries a drum member 16 having an arcuate surface concentric with the turret and hub for a purpose to appear later.

A motor is provided for turning the turret about the post and is shown as comprising an elongated cylinder 17 slidably enclosing a piston 18 having rigid tubular piston rods 19 and 21 projecting from the opposite sides thereof through the ends of the cylinder. The piston rods 19 and 21 are secured at their outer ends to the bosses 12 respectively, and are adapted to communicate through conduits 22 with a source of actuating fluid for actuating the motor. On their inner ends the piston rods communicate with the interior of the cylinder through ports 23 on opposite sides of the piston, as shown. It will be understood that any desired type of control valves may be provided for regulating the inlet and outlet of actuating fluid, which may be compressed air or a liquid under pressure, as desired.

As actuating fluid is admitted to one end or the other of the cylinder, the cylinder is caused to move along the piston rod and this movement is utilized to turn the turret about its axis. For this purpose, the opposite ends of the cylinder are connected to the drum 16 by flexible tension members such as the straps or cables 24 and 25. As best seen in Fig. 1, the strap 24 is secured at one end to the left end of the cylinder and overlies the arcuate surface of the drum 16, being anchored by fastening means 26 to the right side of the drum. Similarly, the strap 25 is secured to the right end of the cylinder and is connected by fastening means 27 to the left side of the arcuate surface of the drum. Preferably, one of the straps is formed by spaced strap portions between which the opposite strap extends so as to balance the twisting force on the drum.

With this construction, as the cylinder is moved, one or the other of the straps is placed under tension and tends to turn the turret about the drum and the post. By regulating the admission and exhaust of actuating fluid, the turret may be quickly and easily rotated to any desired position.

Fig. 2 illustrates an alternative construction in which the straps or cables are replaced by a gear mechanism, other parts of the structure being identical with like parts in Fig. 1, and being indicated by the same reference numerals.

In this construction the cylinder 17 is formed along one side with a rack 27 fixed to the cylinder and meshing with a gear segment 28 which is carried by the fixed post 15 and which replaces the drum 16. This construction operates in the same manner as that of Fig. 1, differing only in the manner of connecting the cylinder of the drum and post.

In order to prevent the cylinder 17 from rotating on its own axis during operation, the turret may be provided with a guide structure 29. An abutment 31 projects from one side of the cylinder 17 and is slidable in the guide, thereby holding the cylinder against rotation on its own axis without interfering with free sliding movement thereof on the turret. If it is desired to employ flexible tubing in place of the rigid piston rods 19, 21 the guide 29 may be elongated into a straight-line track which will guide the cylinder in its movement across the turret and which will also transmit to the turret the turning effort of the cylinder, all as illustrated in Fig. 4.

Figure 6:
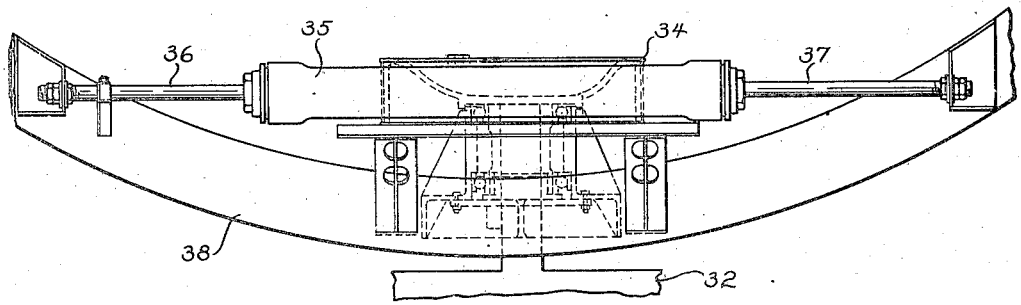
Fig. 6 is an elevation of the structure disclosed in Fig. 5.

Figs. 5 and 6 illustrate an alternative construction in which a rotatable structure, such as a turret 32, is rigidly connected to a drum 34. A cylinder 35 is mounted adjacent and substantially tangent to the drum surface and is slidably mounted on a piston 36 which is disposed therein and which has piston rods 36, 37 projecting from its opposite ends and connected at their outer ends to a non-rotatable part such as the frame member 38. The cylinder is preferably connected to the rotatable drum 34 by means of straps 39, 40, in the manner disclosed in Figs. 1 and 3, but may if desired be connected thereto by gearing as shown in Fig. 2.

In this embodiment, introduction of operating fluid to one or the other end of the cylinders will cause the same to move along the rigidly-supported piston rod, thereby causing rotation of the drum 34 and the attached turret 32 through the medium of the straps, gearing or other means.

While various embodiments of the invention have been illustrated and described in detail, it will be understood that these are illustrative only and are not to be taken as a limitation of the scope of the invention, reference being had for this purpose to the appended claims.

What is claimed is:

1. In combination with a rotatable structure, means to effect rotation thereof comprising a fixedly mounted drum, the center of which is located at the center of rotation of the structure, a cylinder arranged tangentially to the drum and being connected thereto for movement about the periphery of the drum, a piston in said cylinder having a rod extending outwardly thereof and connected at its end to the rotatable structure, and means for causing relative movement of the cylinder and piston to cause the structure and the cylinder and piston to turn about the drum.

2. In combination with a turret member, a post member on which the turret is rotatably mounted, a drum concentric with the axis of rotation of the turret and rigidly connected to one of the members, an elongated rigid piston rod lying substantially tangent to the drum, means rigidly connecting the piston rod to the other of the members, a piston on the piston rod, a cylinder slidable on the piston, and means to connect the cylinder to the drum whereby when the cylinder moves on the piston the turret will be turned around the post.

3. In combination with a turret, a post on which the turret is rotatably mounted, a drum carried by the post concentric with the axis of rotation of the turret, a piston rod rigidly mounted on the turret and lying substantially tangent to the drum, a piston on the piston rod, a cylinder slidable on the piston, means connecting the cylinder to the drum, and means to supply operating fluid to the cylinder to cause it to move relative to the piston thereby to turn the turret on the post.

4. In combination with a turret, a post on which the turret is rotatably mounted, a drum carried by the post concentric with the axis of rotation of the turret, a piston rod rigidly connected at its opposite ends to the turret and lying substantially tangent to the drum, a piston on the central part of the piston rod, a cylinder slidable on the piston, means connecting the cylinder to the drum, and means to supply operating fluid to the cylinder.

5. In combination with a turret, a post on which the turret is rotatably mounted, a drum carried by the post concentric with the axis of rotation of the turret, a piston rod rigidly connected at its opposite ends to the turret and lying substantially tangent to the drum, a piston on the central part of the piston rod, a cylinder slidable on the piston, means connecting the cylinder to the drum, the piston rod being hollow and communicating with the cylinder on opposite sides of the piston, and fluid connections to the ends of the piston rod to supply actuating fluid to the cylinder.

6. In combination with a turret, a post on which the turret is rotatably mounted, a drum secured to the turret and concentric with its axis of rotation, brackets carried by the post and extending in opposite directions therefrom, a piston rod secured at its ends to the brackets and lying substantially tangent to the drum, a piston on the piston rod, a cylinder slidable on the piston, means connecting the cylinder to the drum, and means to supply operating fluid to the cylinder.

FRANK B. LANE.